United States Patent [19]

Leitz et al.

[11] Patent Number: 4,877,627

[45] Date of Patent: Oct. 31, 1989

[54] BALANCED FIBER COMPOSITION

[75] Inventors: Richard E. A. Leitz; Donald J. Pusateri, both of Hemet, Calif.

[73] Assignee: Nutrilite Products, Inc., Buena Park, Calif.

[21] Appl. No.: 898,056

[22] Filed: Aug. 19, 1986

[51] Int. Cl.$^4$ .............................................. A23L 1/29
[52] U.S. Cl. ..................................... 426/285; 424/441; 426/615; 426/616; 426/804
[58] Field of Search ................. 426/615, 616, 93, 804, 426/285; 424/441

[56] References Cited

U.S. PATENT DOCUMENTS

| | | | |
|---|---|---|---|
| 2,452,750 | 11/1948 | Halliday et al. | 426/616 |
| 4,181,747 | 1/1980 | Kickle et al. | 426/615 |
| 4,225,628 | 9/1980 | Lynn | 426/616 |
| 4,348,379 | 9/1982 | Kowalsky et al. | 426/804 |
| 4,477,481 | 10/1984 | Eisenhardt | 426/385 |
| 4,526,794 | 7/1985 | Altomare et al. | 426/804 |
| 4,565,703 | 1/1986 | Morley et al. | 426/93 |
| 4,619,831 | 10/1986 | Sharma | 426/302 |
| 4,680,189 | 7/1987 | Schumacher et al. | 426/615 |
| 4,711,786 | 12/1987 | Schmidt | 426/549 |

FOREIGN PATENT DOCUMENTS

| | | |
|---|---|---|
| 2746479 | 10/1977 | Denmark . |
| 125144 | 6/1981 | Denmark . |
| 0059535 | 9/1982 | European Pat. Off. . |
| 0166825 | 8/1986 | European Pat. Off. . |
| 2424029 | 11/1979 | France . |
| 098042 | 6/1983 | Japan . |

OTHER PUBLICATIONS

Food Technology, vol. 38, No. 1, Jan. 1984, pp. 64–69, Chicago, Ill., U.S.; J. L. Vetter "Fiber as a Food Ingredient".

Primary Examiner—Carolyn Paden
Attorney, Agent, or Firm—Burns, Doane, Swecker & Mathis

[57] ABSTRACT

A nutritional fiber composition which comprises approximately 30 to 48.5% fiber, based on the weight of the entire composition, derived from the fruit and vegetable groups, approximately 30 to 48.5% fiber derived from the cereal group and approximately 3 to 40% fiber from sources other then the fruit, vegetable and cereal groups, wherein at least 10% of the total dietary fiber in the entire composition is soluble dietary fiber.

12 Claims, No Drawings

BALANCED FIBER COMPOSITION

FIELD OF THE INVENTION

The present invention relates to a novel nutritional composition of matter comprising a balanced formulation of dietary fibers. This composition contains a preferred ratio of soluble dietary fiber to insoluble dietary fiber and includes a balance of fiber sources from the main food groups.

BACKGROUND OF THE INVENTION

The need for an appropriate balance of crude fiber in the diet of mammalian organisms has been recognized. For many years nutritionists have noted the crude fiber content of foods and the need for this fiber in a balanced diet. However, crude fiber is only part of what is generally referred to as "dietary fiber". In a general sense dietary fiber can be thought of as the undigestible portion of the foods we eat. A more precise definition is that it consists of the parts of plant cells that are not easily broken-up by the digestive enzymes of man. Specifically, dietary fiber may be defined as the sum of the polysaccharides and lignin which are not digested by the endogenous secretions of the human gastrointestinal tract. Thus, dietary fiber is not a single substance but it is composed of at least five different and complex materials including lignin, cellulose, hemicelluloses, pectins, gums and mucilages.

The individual components of dietary fiber may be conveniently divided into two major groups, soluble dietary fiber and insoluble dietary fiber. Insoluble dietary fiber is made up of lignin, cellulose and hemicelluloses. Soluble dietary fibers are substances like pectins, gums and mucilages as well as some hemicelluloses which are not "fibrous" in their physical form but which fit the definition of dietary fiber. Together the soluble and insoluble groups make up Total Dietary Fiber.

One reason for thinking of dietary fiber in terms of its soluble and insoluble components has to do with differences in physiological activity. Although the picture is still far from complete and much research remains to be done, certain things appear to be fairly well established. In general, the insoluble components of dietary fiber are associated with decreased gastrointestinal transit times and increased fecal bulk while the soluble components tend to decrease gastric emptying times and influence nutrient absorption. Thus, insoluble components are thought to be associated with a reduced tendency toward bowel disorders. Soluble dietary fiber, on the other hand, is associated primarily with a reduction in low density lipoproteins and serum cholesterol as well as improved glucose tolerance at least in the short term.

In addition, a further advantage of dietary fiber is that a higher intake of dietary fiber may aid in weight reduction through "caloric dilution" and an increased sense of fullness because of bulk. Unfortunately, the benefits of increased fiber intake are not without risks. It is particularly critical to keep in mind that very large amounts of fiber may interfere with the absorption of other nutrients. However, there does not appear to be a problem with modest levels of fiber intake in conjunction with good mineral nutrition. Thus, a proper balance must be found among the types of fiber available to maximize the benefits of fiber at only modest levels of intake.

Because of the complexity of dietary fiber and the difficulty of establishing its effects, no definite recommendations have been set for adequate intake of dietary fiber. It has been estimated that Western diets provide roughly 10–20 grams per day of total dietary fiber. Nutritional experts have suggested that as much as 25–40 grams per day of fiber could be beneficial in the human diet. At the present time, the Canadian Expert Advisory Committee on Dietary Fiber is recommending to increase the intake of dietary fiber to 32 grams per day. Unfortunately, even in view of these seemingly specific recommendations of experts in the field of nutrition, up through the present time no specific recommendations have been promoted as to the preferred types or balance of fiber products.

Many researchers in the field of dietary fiber have recognized in a very general way, the importance of a wide variety of fiber sources in the diet. Because of the differences in types of dietary fiber and because of individual metabolic differences it seems reasonable to obtain fiber from a variety of sources in order to obtain a more balanced intake of all dietary fiber components. However, no composition has yet been formulated which provides an appropriate balance of fiber which takes full advantage of the nutritional aspects of fiber and attempts to develop a balanced formulation. Furthermore, no such fiber composition has been made available which offers not only a balanced formulation but the convenience of unit-of-use administration.

OBJECTS OF THE INVENTION

An object of the present invention is to provide a unique fiber supplement composition which provides an appropriate balance of fiber while avoiding the disadvantages associated with fiber intake, and thus without serious risk of inducing disorders in the organism.

It is a further object of the present invention to formulate a select fiber composition which contains a preferred ratio of soluble dietary fiber to insoluble dietary fiber and includes a balance of fiber sources from the main food groups.

Thus, an object of the present invention is to provide a good balance of fiber sources modeled after the basic food group approach to sound nutrition.

It is another object of the present invention to prepare a unit-of-use form of a dietary fiber product which is convenient, easy to administer and provides a beneficial total dietary fiber balance.

Typically, the fiber components of the invention are further associated with a non-toxic therapeutically or nutritionally acceptable inert carrier or carriers therefor.

Additional objects of the invention will appear from a reading of the specification and claims which follow.

SUMMARY OF THE INVENTION

Surprisingly, it has been discovered that a novel composition of fibers can be advantageously formulated into a novel nutritional composition and administered to mammals, especially humans, to provide a balanced intake of dietary fiber.

The nutritional fiber composition is formulated so as to comprise approximately 30 to 48.5% fiber of the entire amount of fiber derived from the fruit and vegetable groups based on the total weight of fiber in the composition, approximately 30 to 48.5% fiber derived from the cereal group and approximately 3 to 40% fiber from fiber sources other than the fruit, vegetable and cereal groups, wherein at least 10% of the total dietary fiber is soluble dietary fiber.

DETAILED DESCRIPTION OF THE INVENTION

Most of the fiber of the food we eat comes from the fruit, vegetable and cereal groups. Small amounts come from the protein group, mainly from beans, nuts, seeds, etc. Thus, the balance of the fiber sources in the unique fiber composition of the present invention is such that approximately 30 to 48.5% of the fiber source is derived from the fruit and vegetable groups based on the total weight of fiber in the composition, approximately 30 to 48.5% from the cereal group and approximately 3 to 40% from additional fiber sources. The total amount of fiber from each source totals 100%. Preferably, approximately 40% of the fiber sources is derived from the fruit and vegetable groups, approximately 40% is from the cereal groups and approximately 20% is derived from other fiber sources.

Each of the members of these basic food groups were carefully selected to provide the desired nutritional benefit. To this end, lemon, acerola and carrot were preferably selected to represent the fruit and vegetable fibers. Corn, barley and oat brans preferably provide the cereal fibers. And preferably, soybean bran, psyllium seed husk and guar gum are members of the third group.

High fiber diets generally contain about one-fifth or more of the total dietary fiber as soluble dietary fiber. Furthermore, certain components of dietary fiber such as lignin and cellulose often occur in roughly the same relative proportions. Thus, the nutritional fiber composition of the present invention was developed to supply both the soluble and insoluble forms of dietary fiber wherein at least 10% of the total dietary fiber in the entire composition is soluble dietary fiber and preferably, at least 15% is soluble distary fiber. This ratio was evaluated in light of the relative proportions of the individual fiber components. Thus, three preferred fibers were selected for each group and the preferred balance of each fiber type was determined. The variety of different fiber components were selected to obtain a balanced fiber composition. A balanced fiber composition generally has a good variety or range of types of fiber.

The end result of the foregoing development was a fiber composition having the fiber sources and composition (given in weight % of the total amount of fiber in the composition) presented in Table I. The total amount of fiber from each fiber source equals 100%.

TABLE I

| Fiber Source | Composition (%) Preferred Value | Individual Range (%) | Group Range (%) |
|---|---|---|---|
| Acerola Pulp Powder | 12.2 | 1–20 | |
| Carrot Pulp Powder | 5.0 | 1–20 | } 30–48.5 |
| Lemon Pulp Powder | 22.5 | 1–30 | |
| Corn Bran | 19.5 | 1–30 | |
| Oat Bran | 8.5 | 1–20 | } 30–48.5 |
| Barley Bran | 12.0 | 1–20 | |
| Soy Bran | 11.0 | 1–20 | |
| Psyllium Seed Husk | 5.5 | 1–15 | } 3–40 |
| Guar Gum | 3.8 | 1–15 | |

In the preferred composition identified under the heading "Composition (%) Preferred Value" in Table I, the various fiber types were determined and are now identified under the heading "Composition (%)" in Table II. Table II is based on the nine fibers identified in Table I and does not take into consideration the optional presence of fiber excipients.

TABLE II

Fiber Composition of the Preferred Formula

| Parameter | Composition (%) | Suitable Range (%) |
|---|---|---|
| Crude Fiber | 18.55 | 15–20 |
| Neutral Detergent Fiber | 47.84 | 40–50 |
| Hemicellulose | 24.35 | 20–30 |
| Lignin | 4.20 | 1–5 |
| Cellulose | 20.47 | 15–25 |
| Total Dietary Fiber (TDF) | 69.86 | 40–90 |
| Soluble Dietary Fiber (SDF) | 14.30 | 10–20 |

Thus, in the preferred dietary fiber composition, the relative amounts of total dietary fiber, crude fiber, cellulose and lignin were selected in an attempt to achieve the optimum high-fiber diet. As previously stated, at least 10% of the total dietary fiber in the entire composition is soluble dietary fiber, and preferably, at least 15% is soluble dietary fiber. In the fiber composition of the preferred formula set forth in Table II, more than 20% of the total dietary fiber is present as soluble dietary fiber.

The novel fiber composition of the present invention is uniquely formulated to approximate the fiber composition found in a balanced diet containing the recommended portions of carbohydrates, proteins and fats. Since each basic fiber classification is represented by three fibers, this variety of fiber sources allows the unique dietary fiber composition of the present invention to comprise an excellent adjunct to a diet.

Generally, the primary adverse impact of administering dietary fiber compositions to a mammalian organism is that large amounts of fiber may interfere with the absorption of other nutrients. However, the unique composition of the present invention was specifically designed to provide a balanced composition and thus minimize any problems associated with the use of fiber.

The compositions of the present invention are intended only for oral administration. Typically, the active ingredients of the compositions of the present invention are further associated with a non-toxic therapeutically acceptable inert carrier material. Such carrier materials are well known to those skilled in the art of nutritional formulations. In this regard, reference is made to the text entitled, "REMINGTON'S PHARMACEUTICAL SCIENCES" (Fourteenth Edition), 1970. For instance, suitable oral non-toxic acceptable inert carriers may include lactose, starch (pharmaceutical grade), dicalcium phosphate, calcium sulfate, kaolin, mannitol and powdered sugar. Additionally, when required, suitable binders, lubricants, disintegrating agents and coloring agents can also be included. Typical binders include starch, gelatin, sugars such as sucrose, molasses and lactose, natural and synthetic gums such as acacia, sodium alginate, extract of Irish moss, carboxymethylcellulose, methylcellulose, polyvinylpyrrolidone, polyethylene glycol. ethylcellulose and waxes. The preferred binder is acacia gum. Typical lubricants for use in these dosage forms can include, without limitation, magnesium stearate, stearic acid, hydrogenated vegetable oil, monoglycerides, diglycerides, sucrose fatty acids or any combination thereof. Suitable disintegrators can include, without limitation, starch, methylcellulose, agar, bentonite, cellulose, alginic acid, guar gum, citrus pulp, carboxymethylcellulose and sodium lauryl sulfate. The preferred disintegrator is microcrystalline cellulose.

If desired, a conventional pharmaceutically acceptable dye can be incorporated into the dosage unit form, i.e., any of the standard FD&C dyes. Sweetening and flavoring agents and preservatives can also be included, particularly when a liquid dosage form is formulated, e.g., an elixir, suspension or syrup.

Table I identifies the preferred fiber composition of the present invention and does not identify any additives or excipients generally associated with its administration. The preferred fiber composition may comprise about 40 to 80 weight % based on the weight of one tablet for administration. Thus, about 20–60% of the composition may comprise miscellaneous excipients. Preferably, about 40 to 50 weight % of the tablet comprises the preferred fiber composition.

Miscellaneous fibers may be used as excipients as identified above. The preferred tablet of the present invention contains a variety of excipients including two fiber excipients. These fiber excipients are acacia gum and microcrystalline cellulose. Acacia gum is a soluble fiber which is used as a granulating aid and to improve the compressibility of a tablet. Acacia gum may comprise about 1 to about 5 weight % of the total tablet, preferably about 2.77 weight %. Microcrystalline cellulose is an insoluble fiber which is also used to improve the compressibility of the tablet. Microcrystalline cellulose may comprise about 2 to about 10 weight % of the entire tablet preferably about 6.54 weight %. However, it should be appreciated that at least 10% of the total dietary fiber in the entire composition including additives and excipients is soluble dietary fiber.

Various other materials may be present as coatings or to otherwise modify the physical form of the dosage unit. For instance, tablets, pills, or capsules may be coated with shellac, sugar or both. It is also particularly relevant to note that the fiber composition may readily be prepared in the form of a bulk powder or granules. The composition may be prepared such that approximately 2 grams of fiber in bulk powder form may be mixed with a liquid food product such as milk or orange juice to aid in ease of administration. Alternatively, the powder or granules may be sprinkled on a salad or a breakfast food to aid in ease of administration.

The novel nutritional fiber composition of the present invention is preferably available in unit-of-use administration form. In the unit-of-use system of administration, each unit is prepared as one unit for administration. For example, one capsule, one tablet, one capful of a bulk powder or granules or the like is consistent with the concept of unit-of-use administration. Thus, one or more units of the dosage form is taken at each administration. All the fiber necessary for a daily diet may be obtained by administering one or several of the unit-of-use nutritional fiber compositions of the present invention. The amount of fiber contained within each unit of administration may vary. A typical amount of fiber in each unit for administration may range from about 0.5 gram to about 5 grams. More preferably, there is about 1 to about 3 grams of fiber in each unit for administration. Thus, the frequency of recommended administration may range from one to four times a day.

The compositions of the present invention should contain at least 0.1% of fiber components; generally, the fiber components will comprise between about 2% to about 85% of each dosage unit for administration. Preferably, the fiber composition comprises about 40 to 80 weight % of fiber based on the weight of one dosage unit of administration.

The preferred dosage form is a tablet or bulk powder. The tablet is most preferably designed to be administered either by chewing or swallowing. The chewable tablet form contains the necessary flavoring agents to allow a pleasant taste sensation. The chewable tablet is designed to be chewed for a brief period of time and then swallowed preferably with water or a liquid beverage.

From the foregoing description, one of ordinary skill in the art can easily ascertain the essential characteristics of the instant invention, and without departing from the spirit and scope thereof, can make various change and/or modifications of the invention to adapt it to various usages and conditions. As such, these changes and/or modifications are properly, equitably and intended to be, within the full range of equivalence of the following claims.

What is claimed is:

1. A nutritional high fiber composition for ingestion by mammalian organisms to provide an adjunct to the diet without serious risk of inducing disorders in the organism, said composition comprising approximately 30 to 48.5% fiber derived from the fruit and vegetable groups, based on the total weight of fiber in the composition, wherein at least one of the fibers from the fruit and vegetable group is selected from the group consisting of lemon, acerola and carrot, approximately 30 to 48.5% fiber derived from the cereal group, wherein at least one of the fibers from the cereal group is selected from the group consisting of corn bran, barley bran and oat bran, and approximately 3 to 40% fiber from fiber sources other than the fruit, vegetable and cereal groups, wherein at least one of the fibers from other than the fruit, vegetable and cereal groups is selected from the group consisting of soybean bran, psyllium seed husk and guar gum, and wherein at least 10% of the total dietary fiber is soluble dietary fiber.

2. A composition according to claim 1, wherein approximately 40% of the fiber is derived from the fruit and vegetable groups.

3. A composition according to claim 1, wherein approximately 40% of the fiber is derived from the cereal group.

4. A composition according to claim 1, wherein approximately 20% of the fiber is derived from fiber sources other than the fruit, vegetable and cereal groups.

5. A nutritional fiber composition, comprising about 12.2% acerola pulp powder based on the total weight of fiber in the composition, about 5% carrot pulp powder, about 22.5% lemon pulp powder, about 19.5% corn bran, about 8.5% oat bran, about 12% barley bran, about 11% soy bran, about 5.5% psyllium seed husk and about 3.8% guar gum.

6. A composition according to claim 5, further comprising a non-toxic acceptable inert carrier.

7. A composition according to claim 5, said composition being adapted for oral administration.

8. A composition according to claim 7, said composition being formulated as a tablet.

9. A composition according to claim 8, said tablet being in chewable form.

10. A composition according to claim 7, said composition being formulated in bulk powder form.

11. A composition according to claim 7, said composition being formulated as granules.

12. A composition according to claim 5, said composition suitable for unit-of-use administration.

* * * * *